W. O. BAILEY.
GLASS BEVELING MACHINE OR APPARATUS.
APPLICATION FILED OCT. 1, 1906. RENEWED MAR. 23, 1909.

937,912.

Patented Oct. 26, 1909.
6 SHEETS—SHEET 1.

Witnesses:

Inventor
William O. Bailey
By
James L. Norris, Atty.

W. O. BAILEY.
GLASS BEVELING MACHINE OR APPARATUS.
APPLICATION FILED OCT. 1, 1906. RENEWED MAR. 23, 1909.

937,912.

Patented Oct. 26, 1909.

W. O. BAILEY.
GLASS BEVELING MACHINE OR APPARATUS.
APPLICATION FILED OCT. 1, 1906. RENEWED MAR. 23, 1909.

937,912.

Patented Oct. 26, 1909.
6 SHEETS—SHEET 4.

Witnesses:

Inventor
William O. Bailey
By
James L. Norris.
Atty.

W. O. BAILEY.
GLASS BEVELING MACHINE OR APPARATUS.
APPLICATION FILED OCT. 1, 1906. RENEWED MAR. 23, 1909.
937,912.
Patented Oct. 26, 1909.
6 SHEETS—SHEET 5.
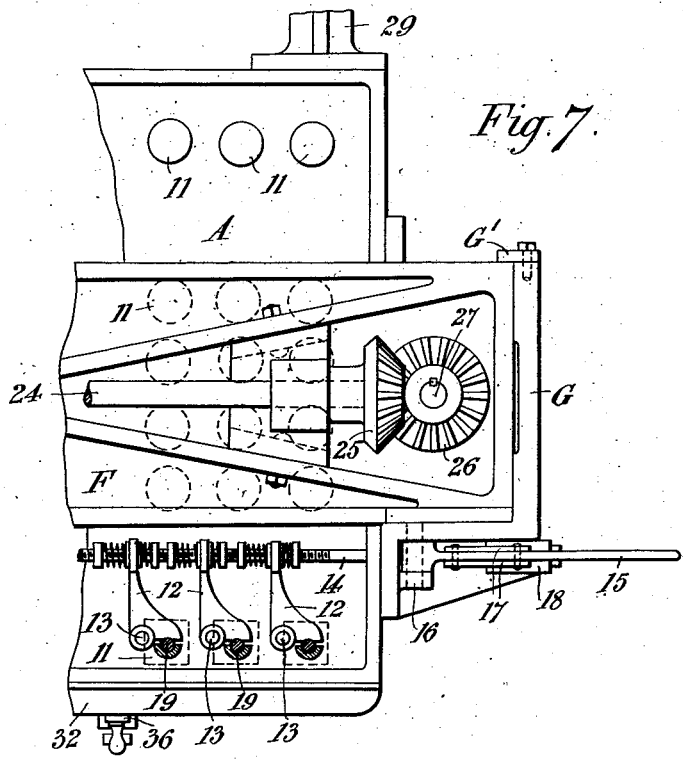
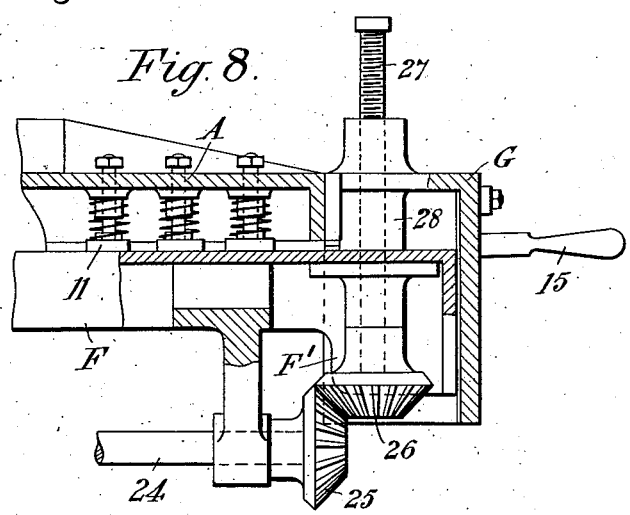
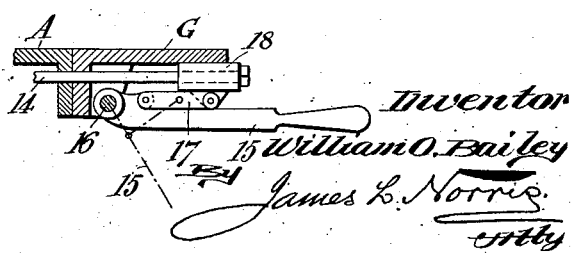

W. O. BAILEY.
GLASS BEVELING MACHINE OR APPARATUS.
APPLICATION FILED OCT. 1, 1906. RENEWED MAR. 23, 1909.

937,912.

Patented Oct. 26, 1909
6 SHEETS—SHEET 6.

Witnesses:

Inventor
William O. Bailey
By
James L. Norris
Atty

UNITED STATES PATENT OFFICE.

WILLIAM OLIVER BAILEY, OF LONDON, ENGLAND.

GLASS-BEVELING MACHINE OR APPARATUS.

937,912. Specification of Letters Patent. Patented Oct. 26, 1909.

Application filed October 1, 1906, Serial No. 336,981. Renewed March 23, 1909. Serial No. 485,234.

*To all whom it may concern:*

Be it known that I, WILLIAM OLIVER BAILEY, a subject of the King of Great Britain, residing at Excelsior Works, Wenlock Road, London, England, have invented an Improved Glass-Beveling Machine or Apparatus, of which the following is a specification.

This invention relates to that type of machine in which the glass is supported upon a fixed frame and its edge beveled by rotating and traveling grinding and polishing mills which are adapted to be moved along in a parallel plane to the edge of the glass, and has for its object to produce a complete glass beveling apparatus of this type in which all the difficulties of holding the glass and insuring the grinding and polishing in a safe, efficient and speedy manner have been overcome. For example, the apparatus is designed to take any usual size or thickness of glass plate or a number of glass plates, and to reproduce exactly on other plates the precise bevel previously cut, so that once the apparatus is set the work can be repeated as many times as required.

To the accomplishment of the recited objects and others subordinate thereto, the preferred embodiment of the invention resides in that construction and arrangement of parts hereinafter described, illustrated in the accompanying drawings, and embraced in the scope of the appended claims.

Figure 1:
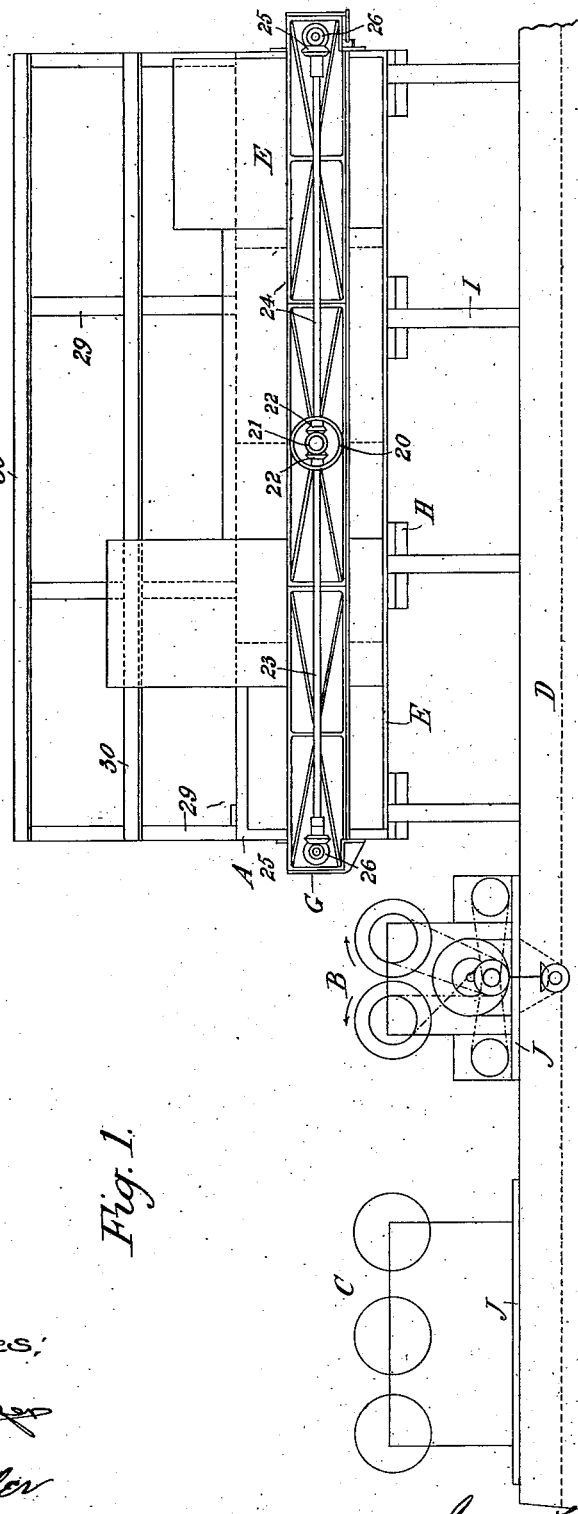
Figure 2:
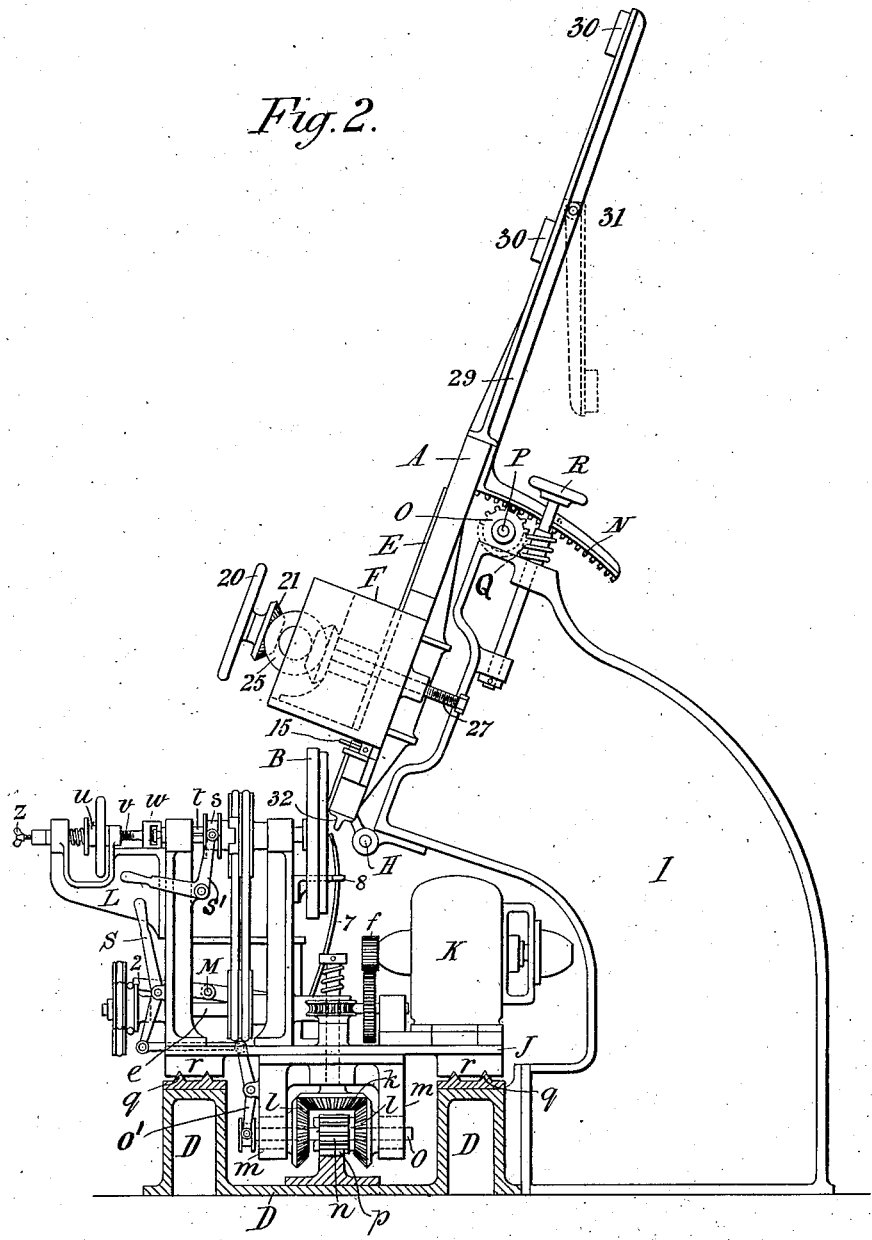
Figure 3:
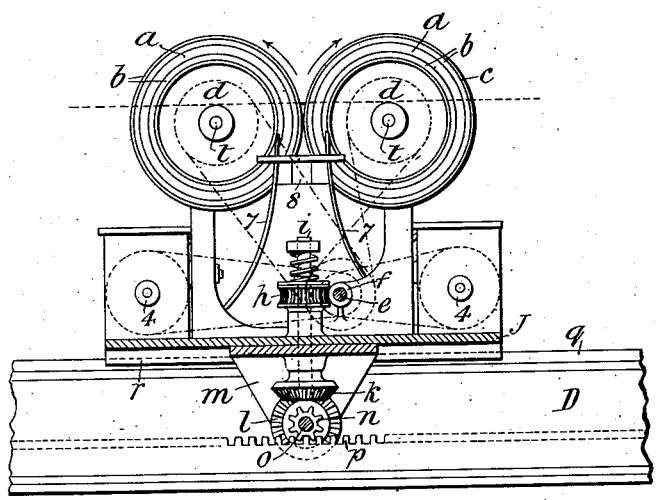
Figure 4:
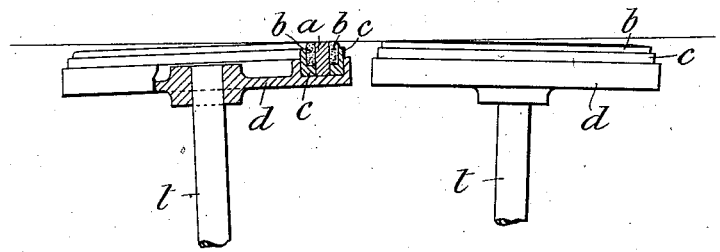
Figure 5:
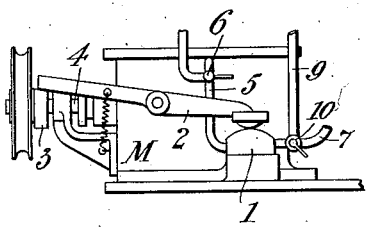
Figure 6:
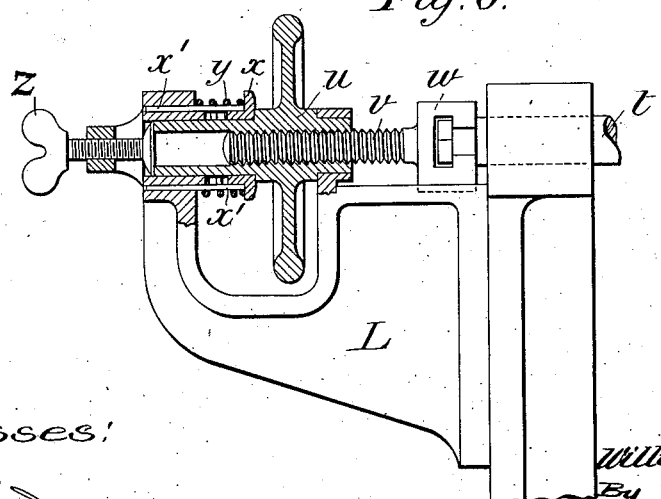
Figure 10:
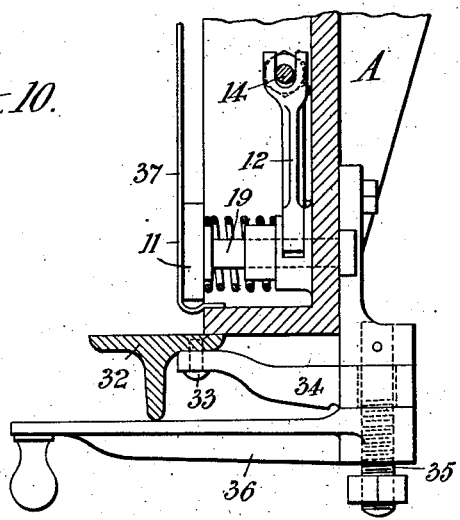
Figure 11:
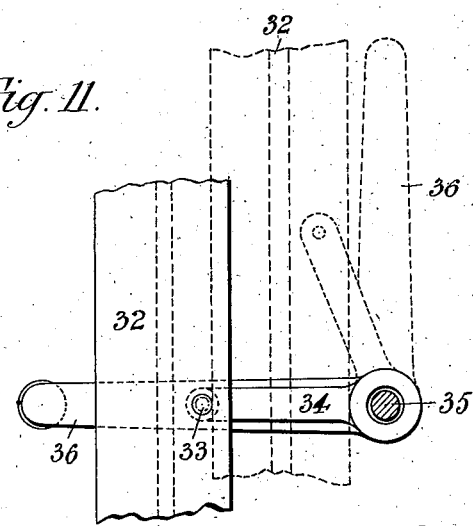

In said drawings, Figure 1 is a diagrammatical view of a complete apparatus. Fig. 2 is an end view of the apparatus; Fig. 3 is a longitudinal section of the traveling mill saddle, Fig. 4 is a sectional plan illustrating the preferred arrangement of the mills; Fig. 5 is a side elevation of the mixing and supplying apparatus, and, Fig. 6 is a detail view of the adjusting device for the mills. Figs. 7 and 8 are respectively a front view and a sectional plan of part of the easel and clamp, Fig. 9 being a sectional detail view of the device for actuating the spring buffer mechanism. Figs. 10 and 11 are respectively a sectional side view and a plan of the lower portion of the easel.

Like reference characters designate corresponding parts throughout the several views.

Referring to Fig. 1 the general arrangement of the apparatus will be readily seen and understood. A is the easel, B C are traveling mills accurately mounted and adapted to be moved upon the bed D backward and forward across the face of the easel. In this drawing B represents the "roughing" mill and C represents a set of three mills respectively "smoothing" "polishing" and "finishing." The glass plates E are held securely upon the easel A by a clamp F extending from end to end and carried by brackets G. The easel is hinged at H to suitable standards I and means such as a segmental rack N, gearing with the pinions O fixed upon the shaft P which is rotated by a worm and worm wheel gearing Q operated by a hand wheel R, are provided for adjusting the angle of the easel; the upper part of the easel is preferably of open or frame construction as shown.

I will first describe the construction and arrangement and operation of the improved mills; reference being made to Figs. 1, 2, 3, 4 and 6, of the drawings. In the first place, I find it necessary to protect one or both edges of the grinding rings $a$ of the mill in order to prevent scoring. This I accomplish by fixing at the inner and outer edges of the ring a protecting ring $b$ (Figs. 3 and 4) of a suitable composition or substance (such as compressed felt of the kind used in glass polishing) which will wear or grind away more readily than the comparatively narrow grinding ring without affecting the work. The protecting rings $b$ are held in position by suitable annular flanged rings $c$ which are firmly fixed to the mill disk $d$. In the second place I find that by employing a pair of mills rotating in opposite directions and arranged slightly angularly, as shown in exaggerated form in plan in Fig. 4, so that the direction of movement of both at the contact with the glass is upward, a greatly improved and expeditious grinding effect is procured. In the third place, I find it advisable to mount the various mills upon separate traveling saddles so as to minimize the danger of the grit used with the roughing mills becoming thrown upon the smoothing and polishing mills, where its presence would utterly spoil the work, unless a considerable time was occupied in washing down the mills and frame, which would be prohibitive from an economical point of view. Thus, as will be seen in Fig. 1, the roughing mills are mounted upon one saddle and the smoothing, polishing and finishing mills upon another saddle or saddles.

Although any suitable motive power may be employed I have shown the application of electric power as being the most convenient and suitable for driving the saddles J along the bed D and rotating the mills. K is an electric motor which drives a countershaft $e$ by means of spur gearing $f$; on the shaft $e$ is a worm $g$ (Fig. 3) which drives a worm wheel $h$ frictionally fixed to the vertical driving shaft $i$ upon which a bevel wheel $k$ is fixed. The bevel wheel $k$ is in gear with a pair of bevel wheels $l$ which are mounted to rotate in suitable depending brackets $m$. A spur pinion $n$, mounted between the bevel wheels $l$ is fixed to a shaft $o$ which is carried by the tubular bosses of the bevel wheels $l$, and is in gear with a rack $p$ fixed in the bed $d$. The ends of the pinion $n$ and the adjacent faces of the bevel wheels $l$ are formed as clutch members of any suitable construction so as to produce a driving motion in either direction by sliding the pinion in or out of engagement with the bevel wheels in a manner well known. The saddle is preferably fitted with V grooved runners $r$ sliding on corresponding rails $q$ on the bed D; by this means any shake or lateral movement of the saddle is entirely prevented and the perfect alinement of the mills with respect to the edge of the glass plates is insured. The mills and their feeding devices (hereinafter described) are driven from the countershaft $e$ as shown by example in Figs. 1, 2 and 3, a suitable clutch as at $s$ being provided on each mill shaft to rotatively connect the mill with the driving gear, the said clutch $s$ being operative by a hand lever $s'$ preferably of the shape shown. The rear end of each mill shaft $t$ (Fig. 6) is provided with a device for adjusting the pressure of the mill upon the glass, and includes a telltale device to warn the operator when too much pressure is being applied. A bracket L carries a tubular nut $u$ which is integral with a hand wheel, and screwing in the nut is a screw rod $v$ the end of which is integral with a slide block $w$ which is connected to the end of the shaft $t$ so as to enable the latter to rotate freely therein. Mounted upon the tubular nut $u$ is a flanged collar $x$ which is provided with a pin or pins $x'$ which pass freely through the bracket bearing, a suitable spring $y$ being provided to force the nut toward the mill frame and consequently to slide the mill shaft and mill to the glass; the length of the pin or pins $x'$ is such that when the required pressure is being applied, the end thereof is just visible projecting beyond the face of the bracket and thereby indicates the fact to the operator.

If it is desired to rigidly set the mill after adjustment, a thumb-screw $z$ is provided, by screwing in which until its head abuts against the end of the tubular nut as shown a rigid adjustment of the mill is secured.

As shown in Fig. 5 each mill is provided with a mixing tank M in which the fluid medium is kept in an agitated state by beaters rotated by a suitable connection with the driving mechanism. This mixer is well known and needs no further description. With my appliance the supply of medium is effected by a series of pulsations which prevent any settlement of the suspended matter within the pipes. A bulb or like compressible chamber 1 fitted with inlet and outlet valves, is acted upon by a lever 2 which is reciprocated by a cam or eccentric 3 fixed upon the mixer shaft 4. The bulb 7 is in communication with the mixer M by a pipe 5 which is provided with a valve 6 by which the supply of medium may be controlled, and the pipe 7 is supported by a bracket, such as 8, with its nozzle projecting toward the face of the inner protecting ring $b$ as shown in Figs. 2 and 3. One of the mixing tanks M is omitted in Fig. 2 for the sake of clearness. The valve 6 may be of such a construction that it may be moved in position to admit air or water when the supply of medium is shut off; also, to enable the bulb or compressible chamber 1 to be readily cleaned out a pipe 9 with a two way valve 10 may be fitted so that when water is admitted by the valve 6 it may be returned to the supply tank without passing up the pipe 7. By these means an even film of medium is imparted to the mill face immediately below the grinding contact, the effect of which is to produce an even distribution of the medium and an even and quick grinding without danger of firing or damage to the glass.

In this type of apparatus it is particularly essential that the means for holding the glass plates to the easel should adapt themselves to various thicknesses of glass while presenting a rigid abutment with absolute accuracy of alinement of the edges to be beveled. This can only be effected by a system of spring buffers, some of which may be locked, and a clamp, the inner face of which is perfectly level and runs truly parallel with the line of travel of the mills. In Figs. 7 to 11 I have shown this part of the mechanism in detail. The easel A, which is formed cellular and in one or more parts bolted together, is provided with a number of spring buffers 11, the bottom row of which have square faces and are provided with locking levers 12 pivoted at 13 and actuated simultaneously by means of a rod 14 fitted with nuts and springs as shown. The rod 14 is operated by a lever 15 which is pivoted at 16 to the bracket G and toggled by a link 17 to the slide block 18 which is adjustably fixed on the rod 14 and slides in the angle of the bracket as shown in Figs. 7 and 9. By this means the spindles 19 of the whole of the bottom row of spring buffers are rigidly held when the glass has been clamped thereto, some being more depressed than others according to the thicknesses of the glass plates. The clamp F, (which may be formed in one piece or in two or more parts rigidly fixed together) must be of such a section as will satisfactorily resist the bending strain applied by its adjusting mechanism, while the bracket G must not only support the clamp F but must guide it to and from the easel parallelly. The clamp adjusting mechanism shown in Figs. 1, 2, 7 and 8 consists of a hand wheel 20 fixed to a bevel wheel 21 which meshes with bevel wheels 22, fixed respectively upon shafts 23, 24, carried in suitable bearings on the clamp. The shafts carry other bevel wheels 25, meshing with bevel wheels 26 fixed to screw threaded shafts 27 which are journaled at the ends of the clamp F and screw through nuts 28 forming part of the bracket G.

The clamp is preferably steadied in the brackets by extensions F' of its running surfaces and by lapping plates G' fixed to the upper edges of the brackets G as shown in Figs. 7 and 8. Preferably also, the easel A is provided with a skeleton upper extension for supporting the upper ends of long plates of glasses, it is composed of stanchions 29 and rails 30 in which a number of spring buffers may be fitted if desired although I have not found it absolutely necessary if the faces of the rails are covered by a resilient material or substance. This extension may be jointed as at 31 (Fig. 2) for use as required.

To temporarily support the glass plates during the loading and unloading of the easel I provide a rail 32 (Figs. 10 and 11) the upper surface of which is true, said rail being pivotally attached at 33 to a number of links 34 which are loosely carried on downwardly projecting studs 35 fixed to the easel. The lower ends of the studs 35 are screw-threaded upon which are screwed the locking arms 36, so that when the arms are in the position shown in Fig. 10 the rail 32 is raised into close contact with the underside of the easel and when rotated through about 90° there is sufficient slackness to enable the rail to be readily moved back under the easel as shown by the dotted lines in Fig. 11 and also in Fig. 2.

37 is a waterproof cloth which is attached to the edges of the frame of the easel A and is designed to prevent access of the grinding and polishing medium to the buffers.

The operation of the device is as follows: The angle of the bevel being determined and the easel adjusted accordingly, the rail 32 is brought into position for supporting the glass E which is placed against the easel. The clamp F is then adjusted until the glass is firmly held against the buffers 11 when the lowermost row of buffers is locked by actuating the lever 15 of the locking mechanism so as to present a practically rigid resistance. The rail 32 is then returned to its normal position under the easel. The roughing mills B with their medium mixers are set in motion, and the saddle upon which they are mounted is run up to the corner of the glass plate and stopped by actuating the clutch lever S and freeing the pinion $n$ from both bevel wheels $i$; the mills are then adjusted to the desired depth of cut by the hand nut $u$ supported by spring $y$ (Fig. 6); the supply of medium to the mills is opened by regulating the cocks 6 and 10 and the saddle set in motion again. The roughing mills pass to and fro along the front of the easel, the depth of cut being regulated by the nut $u$ until the desired bevel on the glass is formed. The set screw $z$ is then adjusted to the nut $u$ giving it a rigid support and the mills passed to and fro along the bevel to give it a partial finish.

A similar procedure is followed with the polishing mills C, the roughing mills being run out of the way to the opposite end of the bed track, or into a side track.

I claim:—

1. In a glass beveling machine, the combination with a stationary adjustable easel and clamping means coöperative therewith, of a plurality of oppositely rotatable grinding mills laterally movable with respect to said easel, each of said mills set at an angle with respect to each other.

2. In a glass beveling machine, the combination with a stationary adjustable easel and clamping means coöperative therewith, of a plurality of grinding mills laterally movable with respect to said easel and having protective rings, each of said easels set at an angle with respect to each other.

3. In a glass beveling machine, the combination with an adjustable easel and clamping means coöperative therewith, of a bed arranged longitudinally with respect to the easel, a plurality of independent saddles mounted on the bed and movable over the same, a plurality of mills carried by each of the saddles, each of said mills rotatable in opposite directions and arranged angularly with respect to each other, motive power carried by the respective saddles for causing the travel thereof and also the revoluble movement of the mills, means for laterally adjusting each of the mills, and fluid supply means for the said mills.

4. In a glass beveling machine, the combination with an easel and clamping means associated therewith, of a plurality of grinding mills arranged at an angle with respect to each other, motive power for driving the mills in opposite directions with respect to each other, mechanism coöperative with the motive power to cause the travel of the mills to bring the same in working position, means associated with each mill for feeding the same laterally with respect to the work, and a fluid supply for the respective mills.

5. In a glass beveling machine, a bed, a plurality of saddles movable upon said bed, a plurality of mills angularly arranged with respect to each other on said saddles, means carried by each of the saddles and coöperative with the mills to drive each of the same in opposite directions with respect to each other and also to cause the movement of the saddles on the bed, an easel having clamping means for the work and arranged in position with respect to the bed to be operated upon by the mills, means for angularly adjusting the easel, independent means for each of the mills to adjust the same laterally with respect to the work, a supply tank having a supply pipe leading to each of the mills, and means for regulating the supply of fluid to the mills from said tank.

6. In a glass beveling machine, a bed, a plurality of saddles movable upon said bed, a plurality of mills angularly arranged with respect to each other on said saddles, means carried by each of the saddles and coöperative with the mills to drive each of the same in opposite directions with respect to each other and also to cause the movement of the saddles on the bed, an easel having clamping means for the work and arranged in position with respect to the bed to be operated upon by the mills, means for angularly adjusting the easel, independent means for each of the mills to adjust the same laterally with respect to the work, a supply tank having a supply pipe leading to each of the mills, means for regulating the supply fluid to the mills from said tank, means for automatically indicating the lateral movement of each mill, and means for temporarily supporting the work during the loading and unloading of the easel.

7. In a glass beveling machine, the combination with a stationary adjustable easel and clamping means coöperative therewith, of a plurality of mills, means for adjusting the pressure of each mill, and means for automatically indicating the amount of pressure applied.

8. In a glass beveling machine, the combination with a stationary adjustable easel and clamping means coöperative therewith, of a plurality of mills, means for adjusting the pressure of each mill, and spring means for automatically indicating the movement of pressure applied.

9. In a glass beveling machine, the combination with a stationary adjustable easel and clamping means coöperative therewith, of a plurality of mills laterally movable with respect to said easel, a mixing tank in operative relation with each mill, means for agitating the fluid medium in said tanks, and means for regulating the supply of fluid medium to said mills.

10. In a glass beveling machine, the combination with a stationary adjustable easel and clamping means coöperative therewith, of a plurality of mills laterally movable with respect to said easel, a mixing tank having a compressible chamber provided with an inlet and an outlet valve, means for intermittently engaging said chamber and thereby agitating the fluid in said tanks, and means for regulating the supply of fluid medium to said mills.

11. In a glass beveling machine, the combination with a stationary adjustable easel and clamping means coöperative therewith, of a plurality of mills, a support for each mill, tracks for said support, a mixing tank in operative relation with each mill, motive power carried by each support for moving the latter laterally with respect to said easel, for rotating said mills, and for agitating the fluid medium in said tanks, and means for regulating the supply of fluid medium to said mills.

12. In a glass beveling machine, the combination with an easel, clamping means coöperative therewith, and spring-actuated buffers thereon, of spindles for said buffers, a plurality of locking levers for said spindles, a rod yieldably connected to said levers, a slidable sleeve adjustably mounted on said rod, an operating rod pivoted to said easel, and a toggle connection for said sleeve and operating rod.

13. In a glass beveling machine, the combination with a stationary adjustable easel and clamping means coöperating therewith, of a plurality of oppositely rotatable grinding mills set at angles with respect to each other, a support for each mill laterally movable with respect to the easel, and motive power carried by each support for operating the mills.

In testimony whereof I have hereunto set my hand in presence of two subscribing witnesses.

WILLIAM OLIVER BAILEY.

Witnesses:
  George C. Downing,
  Walter I. S. Merten.